PATENT OFFICE.

ABRAHAM KRONSTEIN, OF KARLSRUHE, GERMANY.

PROCESS OF HARDENING AND SOLIDIFYING OILS AND UNSATURATED ORGANIC COMPOUNDS.

No. 826,860.          Specification of Letters Patent.          Patented July 24, 1906.

Application filed August 30, 1900. Serial No. 28,584.

*To all whom it may concern:*

Be it known that I, ABRAHAM KRONSTEIN, chemist and doctor of philosophy, a subject of the Emperor of Austria-Hungary, residing at Karlsruhe, Baden, Germany, have invented a certain new and useful Process of Hardening and Solidifying Oils and Unsaturated Organic Compounds, of which the following is a specification.

In my application for Letters Patent filed January 25, 1900, Serial No. 2,794, I have shown that it is possible to obtain the solidification of oils and of a great number of unsaturated organic compounds by subjecting them to a heating process with exclusion of oxidation and decomposition. I have now found that this partial or complete solidification of drying-oils and unsaturated organic compounds, which is due to polymerization, can be greatly accelerated and the thickening effect considerably increased by the addition to the material under treatment of such unsaturated organic compounds of a constitution similar to drying-oils as when subjected alone to the polymerization process will readily solidify. Of such substances I may mention the oil obtained from the berries of the tree *aleurites cordata* or *Eleococca vernicia* and commonly known as "wood-oil," the allyl ester of cinnamic-acid, the diallyl ester of malonic-acid, which by themselves form solid, sometimes elastic, bodies in consequence of the heating with the exclusion of air and without decomposition. If these substances or their equivalents are mixed with other substances which by themselves are not capable of yielding solid materials, they will effect the solidification of the same if used in a certain proportion of more than forty per cent. of the mixture, while if used in amounts of less than forty per cent. they seem to lose their solidifying properties and only shorten the thickening period of the non-solidifying materials. An admixture of but one per cent. of such solidifying substances to those not possessing this quality has been found sufficient to thicken them. Thus linseed-oil, for instance, will by this addition and by a subsequent treatment by heat with exclusion of air and decomposition for a comparatively short period be converted into a substitute for those choice brands of linseed-oil which were heretofore obtained by long exposure to the action of air and sunlight for a period of several years and which are sometimes known as "stand-oil" in the trade. It is obvious that by my invention I am enabled to effect a great economy, both in cost of plant and capital as well as machinery, in the preparation of this particular oil. My process shows the further advantage that in view of the use of certain quantities of the ingredients and of a certain determined way of procedure I am enabled to arrive at a product of always identical qualities. Such mixtures of non-solidifying oils with less than forty per cent. wood-oil or with less than forty per cent. of other solidifying-oils will remain liquid even on prolonged heating. On the other hand, if the addition of such substances is increased beyond forty per cent. the otherwise non-solidifying oils will readily coagulate if heated below their point of decomposition and with the exclusion of oxidation. If the solid products thus obtained are heated by themselves to a temperature of about 330° centigrade, (572° Fahrenheit,) they melt and form an oil of high viscosity which is highly soluble in benzol, light oil of camphor, oil of turpentine, and the like and which when cool only solidifies when exposed to the oxidizing action of air and the viscosity of which may be further increased by distilling off about five per cent. of the above-mentioned heated mixture. This viscid oil is highly suitable for the manufacture of choice japans, varnishes, cements of linoleum, and the like.

Examples.

First. Twenty pounds of linseed-oil mixed with four pounds wood-oil, for instance, are kept in a closed vessel at a temperature of, say, 200° centigrade for about twelve hours. When cool, the product is a perfect substitute for the so-called "stand-oil" of commerce produced by long keeping of linseed-oil.

Second. A solution of twenty pounds styracine in twenty pounds allyl ester of cinnamic acid are kept at about 170° centigrade in a closed enameled vessel. After from six to eight hours the product shows the properties of the balsams of nature and particularly resembles balsam peru. On prolonged heating this substance forms an amber-like resinous body.

Third. Twenty pounds of linseed-oil mixed with twenty pounds of wood-oil on being treated in the same manner yield a hard elastic resin. If now the temperature is raised to 300° centigrade, the solid body liquefies to an oil of high viscosity which becomes solid on cooling only on exposure to air. The same oil, but of increased viscosity, may be obtained by heating the aforesaid mixture in a still until about five per cent. have distilled over.

Fourth. A mixture of twenty pounds cotton-seed oil and twenty pounds wood-oil is subjected to the same treatment and yields an elastic solid body.

I am aware that it is old to thicken linseed and cotton oil, respectively, by the addition of an excess of wood-oil and then to add a suitable reducer, and I wish to make no claims specifically to such mixtures, which are distinguished from my invention because a reducer is indispensable if it be desired to keep the mixture always in a liquid state. In my invention I am enabled to use any solidifying unsaturated organic compound similar to drying-oils other than wood-oil and in any proportions whatsoever, so as to obtain various grades of consistency from liquid to solid without the use of a reducing agent and without fear of overstepping the desired degree of consistency and also to vary the time required for solidification.

What I claim, and desire to secure by Letters Patent of the United States, is—

1. The process herein described of increasing the consistency of drying-oils and unsaturated organic compounds, which consists in admixing them with wood-oil, heating the mixture with the exclusion of oxidation and decomposition until solidification takes place, and then raising the heat of the mixture to about 300° centigrade.

2. The process herein described of hastening and improving or assisting the thickening effects of the non-oxidizing action of heat upon vegetable and artificial unsaturated ester-like oily products, which consists in mixing readily-solidifying substances of this class in any state of solidification with substances of the same class difficult of thickening and solidification, then submitting said mixtures to a non-oxidizing heating process at a temperature of about 170° to about 250° centigrade until solidification sets in during the heating process itself, then increasing the heat until the solid body obtained melts to form a highly-viscid oil which solidifies again by exposure to air.

3. The process herein described of hastening and improving or assisting the thickening effects of the non-oxidizing action of heat upon vegetable and artificial unsaturated ester-like oily products, which consists in mixing readily-solidifying substances of this class in any state of solidification with substances of the same class incapable of thickening and solidification, then submitting said mixture to a non-oxidizing heating process at a temperature of about 170° to about 250° centigrade until solidification sets in during the heating process itself.

4. The process herein described of producing solid insoluble bodies from fluid organic oil-like unsaturated, ester-like substances, not solidifiable by heat, which consists in adding to such substances an excess of fluid substances of the same class solidifiable by heat and heating the mixture and continuing the heating until the entire mass has solidified and then cooling the mixture.

5. The process herein described of solidifying linseed-oil, which consists in mixing linseed-oil with an excess of wood-oil or tung-oil, heating the mixture and continuing the heating until the mixture has solidified and then cooling the product.

6. The mixture herein described consisting of oils not solidifying by heat and oils solidifying while heating, said oils being heated until solidification takes place.

In witness whereof I have hereunto signed my name in the presence of two subscribing witnesses.

ABRAHAM KRONSTEIN.

Witnesses:
C. B. HURST,
ALVESTO S. HOGUE.